US006816810B2

(12) United States Patent
Henry et al.

(10) Patent No.: US 6,816,810 B2
(45) Date of Patent: Nov. 9, 2004

(54) PROCESS MONITORING AND CONTROL USING SELF-VALIDATING SENSORS

(75) Inventors: Manus P. Henry, Oxford (GB); David J. Sandoz, N Wales (GB); David W. Clarke, Oxford (GB)

(73) Assignee: Invensys Systems, Inc., Foxboro, MA (US)

( * ) Notice: Subject to any disclaimer, the term of this patent is extended or adjusted under 35 U.S.C. 154(b) by 208 days.

(21) Appl. No.: 09/815,275

(22) Filed: Mar. 23, 2001

(65) Prior Publication Data

US 2002/0042694 A1 Apr. 11, 2002

(30) Foreign Application Priority Data

Mar. 23, 2000 (GB) .............................. 0007065

(51) Int. Cl.[7] ............................. G06F 101/14

(52) U.S. Cl. ..................................... 702/179

(58) Field of Search .................... 702/35, 104, 116, 702/179, 181, 182, 185

(56) References Cited

U.S. PATENT DOCUMENTS

| | | | |
|---|---|---|---|
| 4,926,364 A | 5/1990 | Brotherton | 702/179 |
| 5,570,300 A | 10/1996 | Henry et al. | 702/45 |
| 5,586,066 A | 12/1996 | White et al. | 702/181 |
| 5,680,409 A | 10/1997 | Qin et al. | 714/799 |
| 5,774,378 A | * 6/1998 | Yang | 702/104 |
| 5,850,625 A | 12/1998 | Maren et al. | 702/93 |
| 6,047,220 A | 4/2000 | Eryurek | 700/28 |

FOREIGN PATENT DOCUMENTS

| | | |
|---|---|---|
| EP | 0827096 | 3/1998 |
| WO | WO 93/21505 | 10/1993 |
| WO | WO 00/10059 | 2/2000 |

OTHER PUBLICATIONS

Henry et al.; "The Self–Validating Sensor: Rationale, Definitions and Examples"; *Control Engineering* vol. 1, No. 4; pp. 585–610; 1993.

Qin et al.; "A Self–Validating Inferential Sensor for Emission Monitoring"; *Proceedings of the American Control Conference* vol. 1, pp. 473–477; 1997.

Atia et al.; "A Self–Validating Temperature Sensor Implemented in FPGAs"; *Proceedings of the 5th International Workshop on Field Programmable Logic and Applications*; pp. 321–330; 1995.

Yang et al.; "Control Using Self–Validating Sensors"; *Transactions of the Institute of Measurement and Control*, vol. 18, No. 1; pp. 15–23; 1996.

Sheung Kai Yung, "Signal Processing in Local Sensor Validation," University of Oxford, Dept. of Engineering Science; Ph.D. Thesis, 1993.

(List continued on next page.)

*Primary Examiner*—Michael Nghiem
(74) *Attorney, Agent, or Firm*—Fish & Richardson P.C.

(57) ABSTRACT

Self-validating (SEVA) sensors implemented in a control process provide various metrics regarding sensed variables to a central control unit. Specifically, SEVA sensors provide measurements of the variables and validity information about the measurements, which may include fault information about the sensors themselves. A control unit utilizes the various SEVA metrics even when large numbers of SEVA sensors are used, a situation that is otherwise problematic due to difficulties in assimilating data from multiple SEVA sensors. Accordingly, the control unit distinguishes sensor faults from actual process changes, and responds as needed, even when large numbers of SEVA sensors are implemented together. Specifically, the monitoring and control unit assimilates signals from multiple SEVA sensors using a multi-variate statistical analysis, and compares results of this analysis with a model characterizing behavior of the process (where the model may take into account actuator position information) and/or historical statistical data.

19 Claims, 6 Drawing Sheets-

OTHER PUBLICATIONS

Atia et al., "Self–Validating Temperature Sensor Implemented in FPGAs", Oxford University Dept. of Engineering Science, 1995, pp. 321–330.

Henry et al., "The Self–Validating Sensor: Rationale, Definitions and Examples", Dept. of Engineering Science, Univ. of Oxford, vol. 1, No. 4, 1993, pp. 585–610.

J. C.–Y. Yang et al., "Control using self–validating sensors", Department of Engineering Science, Univ. of Oxford, vol. 18, No. 1, 1996, pp. 15–23.

Kresta et al., "Multivariate Statistical Monitoring of Process Operating Performance", Chemical Engineering Dept., McMaster Univ. Ontario, vol. 69, Feb. 1991, pp. 35–47.

MacGregor et al., "Statistical Process Control of Multivariate Processes", Chemical Engineering Dept., McMaster Advanced Control Consortium, McMaster Univ. Vol. 3, No. 3, 1995, pp. 403–414.

MacGregor J. F. et al., 1991, Multivariate Statistical Methods in Process Analysis and Control. AIChE Symposium Proceedings of the Fourth International Conference on Chemical Process Control, AIChE Pub. No. P–67, New York, pp. 79–99.

McFarlane R.C. et al., Dynamic Simulator for a Model IV Fluid Catalytic Cracking Unit, American Institute of Chemical Engineering, Chicago, IL, Nov. 14, 1990, pp. 1–79.

Moffat R.J., 1982, Contributions to the theory of single sample uncertainty analysis. ASME *Journal of Fluids Engineering*, vol. 104, Jun. 1982, pp. 250–260.

Morud T.E., 1996, Multivariate Statistical Process Control; Example from the Chemical Process Industry, *Journal of Chemometrics*, vol. 10, Nos. 5 & 6, pp. 669–675.

Qin et al., "Self–Validating Inferential Sensor for Emission Monitoring", Dept. of Chemical Engineering, Univ. of Texas, Jun. 1997, pp. 473–477.

Yang J.C.–Y.; 1994, "Self–validating Sensors", Dr. of Phil. Thesis, Department of Engineering Science, Univ. of Oxford.

G. Wood, UK Activities in Measurement Validation and Data Quality, (Oct. 2000), Computing & Control Engineering Journal.

M. Henry, Plant Asset Management Via Intelligent Sensors Digital, Distributed and For Free, Oct. 2000, Computing & Control Engineering Journal.

M. P. Henry, The Integration of Fault Detection Within Plant–Wide Data Quality Management. vol. 2; Jun. 13–16, (1994), IFAC–Safeprocess 94.

U. Enste & F. Uecker, The Use of Supervisory Information in Process Control, (Oct. 2000), IEE Computing & Control.

J. C. Yang & D.W. Clarke, The Self–Validating Actuator, vol. 7, pp. 249–260. (1999), Control Engineering Practice.

J. K. Hackett & M. Shah, Multi–Sensor Fusion: A Perspective, (1990), IEEE.

R.C. Luo & M. G. Kay, A Tutorial on Multisensor Integration and Fusion, (1990), IEEE.

M.P. Henry, "Self–Validating Sensor", Control Engineering Europe, pp. 32–39, Jun. 2001.

M. Henry, Self–Validating Digital Coriolis Mass Flow Meter, (Oct. 2000), Computing & Control Engineering Journal.

S. J. Kline et al., "Describing Uncertainties in Single–Sample Experiments", Mechanical Engineering, pp. 3–8, 1853.

Paul M. Frank, "Fault Diagnosis in Dynamic Systems Using Analytical and Knowledge–based Redundancy—A Survey and Some New Results," Automatica, vol. 26, No. 3, pp. 459–474, 1990.

R. J. Moffat, "Contributions to the Theory of Single–Sample Uncertainty Analysis", ASME Journal of Fluid Engineering, vol. 104, pp. 250–260, 1982.

M. P. Henry et al., "The Self–Validating Sensor: Rationale, Definitions and Examples," Control Engineering Practice, vol. 1, No. 4, pp. 585–610, 1993.

M. P. Henry, "A SEVA Sensor—The Coriolis Mass Flow Meter," IFAC Fault Detection, Supervision and Safety for Technical Processes, vol. 2, pp. 429–434, 1994.

* cited by examiner

PROCESS MONITORING AND CONTROL USING SELF-VALIDATING SENSORS

This invention relates to process monitoring and control using self-validating sensors.

The term 'process' is used herein in its broad control theory context to include controlled devices, plant and controlled systems generally.

The model for self-validating (SEVA) sensors was proposed by Henry and Clarke (1993). It specifies that every sensor should make use of all the information available to generate the following standard metrics for each measurement:

Validated Measurement Value (VMV): this is the best estimate of the measurement that can be provided by the sensor under the current circumstances. It is implied that the sensor should have self-diagnostic capability, and endeavours to correct for the effects of any faults on the 'raw' measurement as far as possible.

Validated Uncertainty (VU): if a reported measurement M has an uncertainty of δM, then by definition the true value of the measurement $M_{true}$ should be in the range $$M - \delta M \leq M_{true} \leq M + \delta M$$

with a certain probability (typically 95%). Methods for estimating the measurement uncertainty under a variety of conditions can be found in Yang (1994). Note that in the presence of a fault, a SEVA sensor is not only required to correct the VMV, but also to adjust the VU so as to cater for the reduction in the confidence of the corrected reading.

MV Status: this reflects the presence and the persistence of any sensor fault, and indicates how the VMV is generated. The MV Status can take any one of the following values:

Clear: the confidence in the 'raw' measurement is nominal, and the VMV is generated purely from the current 'raw' measurement.

Blurred: a fault has been diagnosed and it impairs measuring capability. The VMV is generated by compensating the current 'raw' measurement.

Dazzled: the 'raw' measurement is substantially abnormal and the confidence associated with it is zero, but the fault is judged to be temporary (eg, a spike). The VMV is generated from the device's past history.

Blind: a fault that destroys the measuring capability of the sensor has been diagnosed. There is no confidence in the 'raw' measurement. The VMV is generated from the device's past history.

Secure: the VMV is obtained by combining redundant SEVA measurements. The confidence in each SEVA measurement is nominal.

Unvalidated: validation is not taking place.

The implementation of a SEVA version of the Foxboro 871 Clark-type dissolved oxygen sensor is described by Clarke and Fraher (1995).

Control using self-validating sensors has been discussed by J. C.-Y. Yang and D. W. Clarke (1966). It was proposed that in the case of a simple feedback loop in which a SEVA sensor provides the feedback signal, it should be possible to make use of the metrics to select strategies to respond appropriately to sensor faults and unfavourable operating conditions. In the case that not only the nature of the fault, but also the bounds of the residual error, can be supplied by the SEVA sensor, then it may be possible for the controller to decide whether the fault effect is substantial enough to require controller re-tuning or reconfiguration.

In practice, most processes require for effective control the monitoring of a large number of plant variables involving the use of a large number of sensors, ie process variable transmitters. Practical control systems have not yet been developed which are able to fully utilise the metrics of the SEVA measurements. For example, a relatively sophisticated plant monitoring system is the CONNOISSEUR™ plant monitoring system version 14.00 sold by Simsci Limited of Stockport, England. The CONNOISSEUR™ 14.00 monitoring system, although capable of being used to monitor a relatively complex plant, such as a fluidised catalytic cracking unit, was not able to make full use of SEVA metrics from the, typical, thirty plus sensors required to monitor such a plant.

We consider that there is a need for a process monitor that is able to interact with one or more SEVA sensors so as to distinguish between actual changes in the process operation and fault conditions in one or more of the SEVA sensors in a hierarchical system.

According to one aspect of the present invention a multi-level (hierarchical) process monitoring system comprises a process monitoring unit, at a higher level of the system, and a plurality of sensors, at least one of the sensors having SEVA capability, at a lower level of the system, the sensors being adapted to provide respective measurement values of respective process variables to said monitoring unit, said monitoring unit being so arranged as to monitor the outputs of the sensors and to identify any significant apparent change in the process conditions as detected from an overview of said sensor outputs, and on detection of an apparent significant change, to request additional status information from at least one of the SEVA sensor/s to determine whether the apparent change is in reality due to a change in the characteristics of a particular SEVA sensor rather than an actual significant change in the process conditions.

The process monitoring system preferably comprises one or more actuators to effect process changes and the actuators are preferably arranged to provide the monitoring unit with actuator position signals.

Preferably most of the sensors are SEVA sensors.

The monitoring unit preferably implements a multivariate statistical analysis of the measurement values of the sensors, and compares the results of that analysis with reference information to identify any significant apparent change in process conditions, to determine whether or not to initiate interrogation of the SEVA sensor/s.

The reference information is preferably comprised of predictions of a model and historical data of stored statistical analyses. Thus, both history and model predictions are desirably used as the bases for characterising 'normal process operation'.

The model preferably utilises actuator position information.

For convenience, we refer on occasions hereafter to 'interrogation' of a SEVA sensor for the process of requesting additional status information from the SEVA sensor.

Although the interrogation may often relate to the mere examination of at least some of the usual sensor outputs of the SEVA sensor, on other occasions, depending on the type of SEVA sensor, interrogation may involve the application of a non-routine test in or to the SEVA sensor. For example, when the SEVA sensor comprises a thermocouple for measuring temperature, interrogation may involve the application of current to the sensor to heat up the sensor to determine whether good thermal contact is present. Such a test would not normally be initiated by the internal software of the SEVA sensor, because the test directly affects the principal output of the sensor. Some tests reduce the life of a SEVA sensor and accordingly are not carried out on a routine basis or only relatively infrequently.

Thus the invention provides interactions between the higher level monitoring unit and the lower level SEVA sensor/s, in which the detection of an apparent significant change in process operation by the monitoring unit initiates interrogation of one or more of the SEVA sensors, and the resulting changes in the SEVA sensor outputs is then analysed by the monitoring unit to determine whether or not the perceived change is an actual process change. In the event that the monitoring unit determines that the perceived change is an actual change in the process conditions then this is preferably arranged to provide an alert signal which may be directed at a process operative or/and may result in attempted corrective action by a process control unit.

According to a second aspect of the invention we provide a process-monitoring unit adapted for use in a process monitoring system in accordance with the first aspect of the invention.

Although the invention is applicable to processes in which the various sensors measure different variables, the invention is also applicable to situations in which at least some SEVA sensors measure the same variable, and the SEVA measurements (VMV, VU and MV status) of the same variable are combined to generate a best estimate Some examples of hierarchical control systems in accordance with the invention will now be described, by way of example only, with reference to the accompanying drawings, in which:

Figure 1:
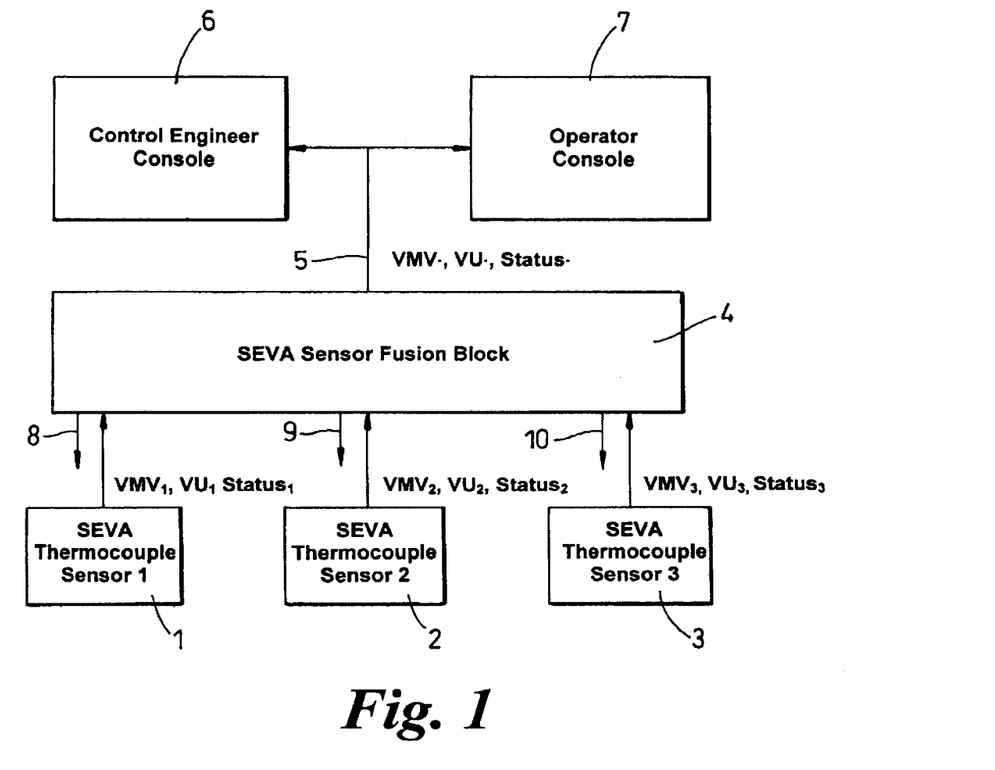
FIG. 1 is a diagram of a hierarchical temperature monitoring system employing three SEVA thermocouples to monitor the temperature of the same process parameter, FIG. 2 indicates SEVA sensor fusion in general as described in Appendix 1.

With reference to FIG. 1, three thermocouple SEVA sensors 1, 2, 3 at a lower level of the multi-level (hierarchical) system are capable of providing respective VMV, VU and Status output to a monitoring unit 4 which performs the function of a SEVA sensor fusion block in that it 'fuses' the outputs of the sensors 1, 2 and 3 to provide a single output 5 (of VMV, VU and Status) to PC consoles 6 and 7, and provides consistency flags 8, 9 10. The sensors 1, 2 and 3 monitor the same process parameter ie temperature.

Each thermocouple card is capable of generating VMV, VU and Status data for the associated thermocouple. For example, thermocouple card 1 is capable of generating $VMV_1$, $VU_1$ and $Status_1$ output signals to monitoring unit 4.

The method of fusing the output signals of the sensors 1, 2 and 3 and the generation of consistency flags is described in Appendix 1.

When a consistency flag is generated in response to detection by the monitoring unit 4 that an output of one of the thermocouple sensors 1, 2 3 is inconsistent with the corresponding outputs of the other two cards, the consistency flag is caused to interrogate the respective suspect thermocouple. In response to a request from the higher level a current injection test of the suspect thermocouple is initiated to detect loss of contact with the process. Such a test is programmed in the SEVA to be carried out once per hour by default.

If as a result of the current injection test the suspect thermocouple sensor determines that it has lost contact with the process, then it switches its MV status to blind. The software in the unit 4 will then determine that, at least for a predetermined period, the output of the suspect thermocouple is ignored and the output 5 then takes the form of the fused outputs of the other two thermocouples. Instead of, or in addition to, the flag outputs 8, 9, 10 being used to interrogate the suspect thermocouples, the flag outputs may be used to indicate to an operative that one of the SEVA sensors is in need of re-calibration, or to make recommendations to an associated process controller.

Figure 4:
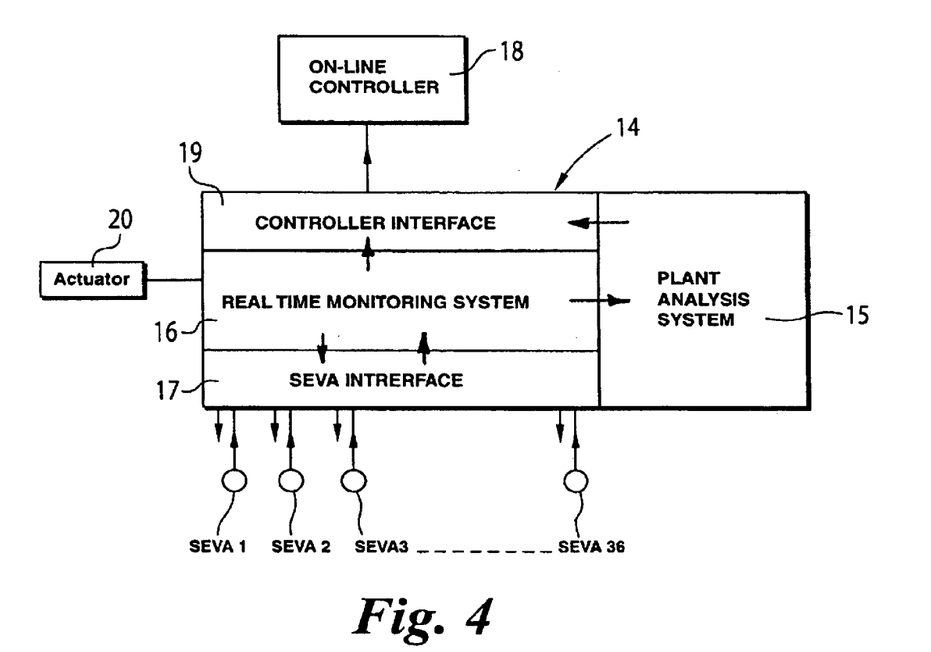
FIG. 4 is a schematic of a monitoring and control system for a complex process which incorporates multivariate statistical analysis of SEVA outputs, and use of a process model.
Figure 5:
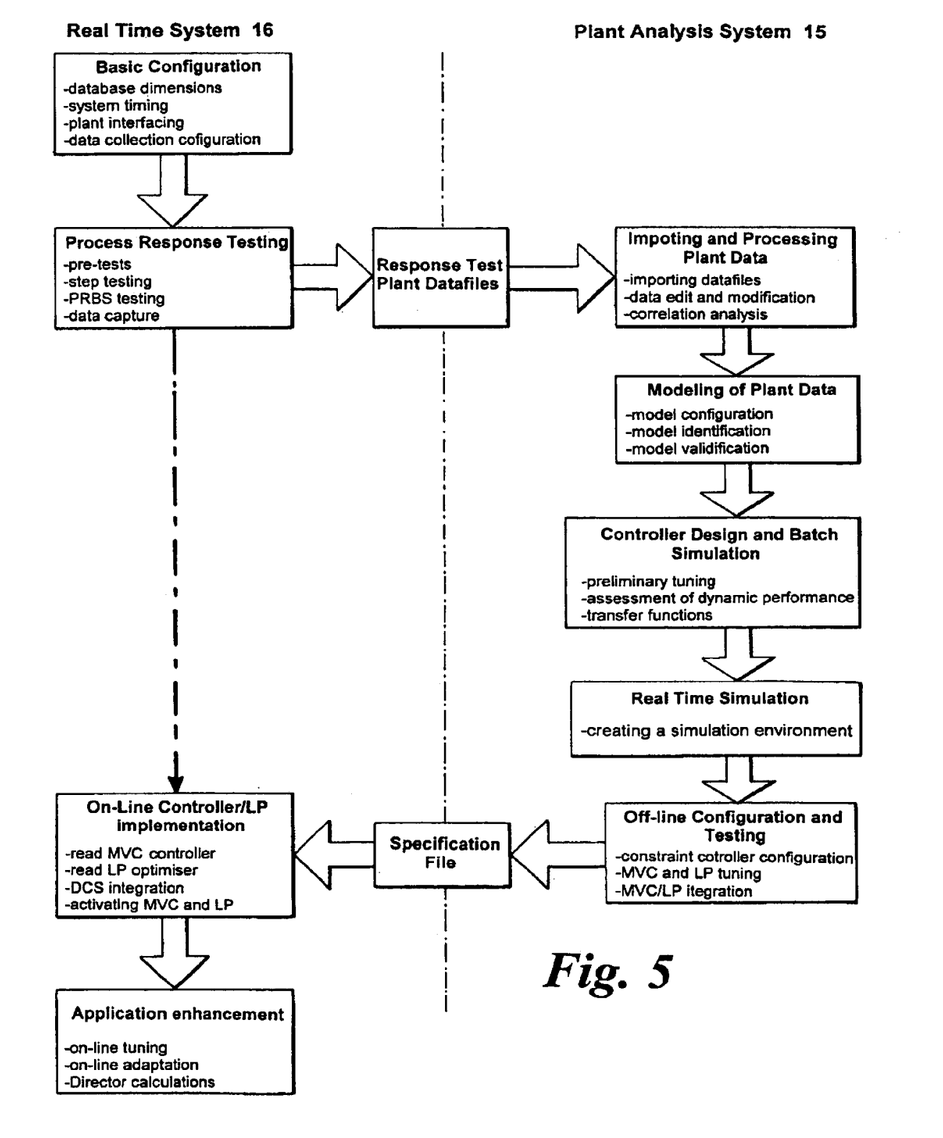
FIG. 5 is a flow chart of the main functions performed by the main monitoring unit of the system of FIG. 4.
Figure 6:
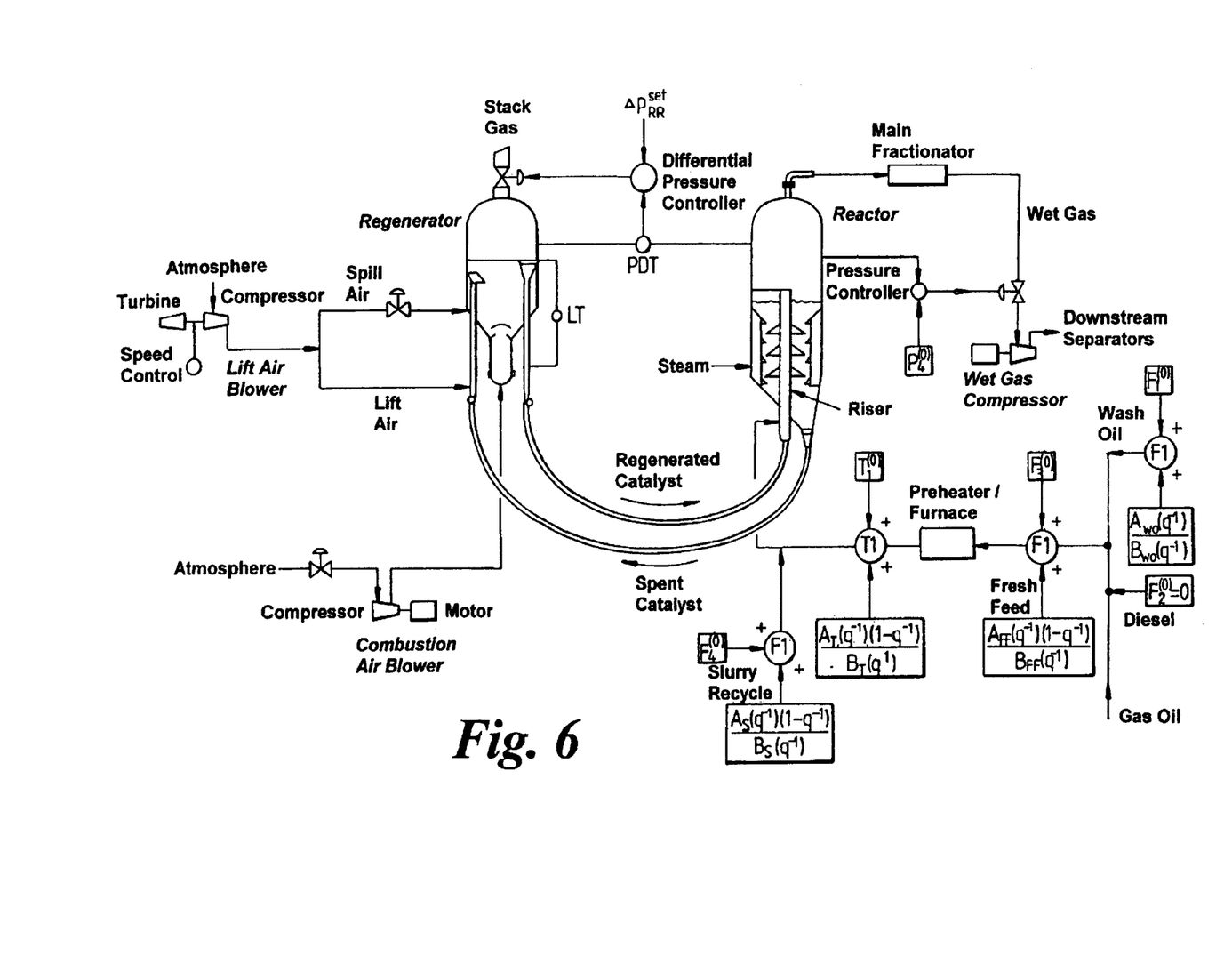
FIG. 6 is a schematic of a fluidised catalytic cracking unit process model incorporated in the process model portion of the system of FIG. 4.

Thus the high level fusion block responds to the blind signal coming from the lower level SEVA sensor. Referring now to FIG. 4, this diagrammatically shows a process monitoring system which is capable of being used to monitor a complex process, such as a fluidised catalytic cracking unit (FCCU) and is capable of utilizing the output of 36 SEVA sensors, referenced SEVA 1, SEVA 2—SEVA 36, responsive respectively to 36 measured variables of the process being controlled by on-line controller, and position outputs of actuators, represented in FIG. 4 as an actuator 20. The principal function of the monitoring unit in terms of the configuring and utilization of a plant model are shown in FIG. 5. The plant model in the case of an FCCU is shown in FIG. 6 and is described by McFarlane (1993).

With reference to FIG. 4, the plant model is implemented by the plant analysis system 15 portion of monitor 14. The real time monitoring system 16 interacts with the plant analysis system 15 in the manner indicated in FIG. 5.

The real time monitoring system portion 16 of monitor 14 interfaces with the sensors SEVA1 to SEVA36 by way of SEVA interface 17 and with an on-line controller 17 by way of controller interface 19.

Figure 7:
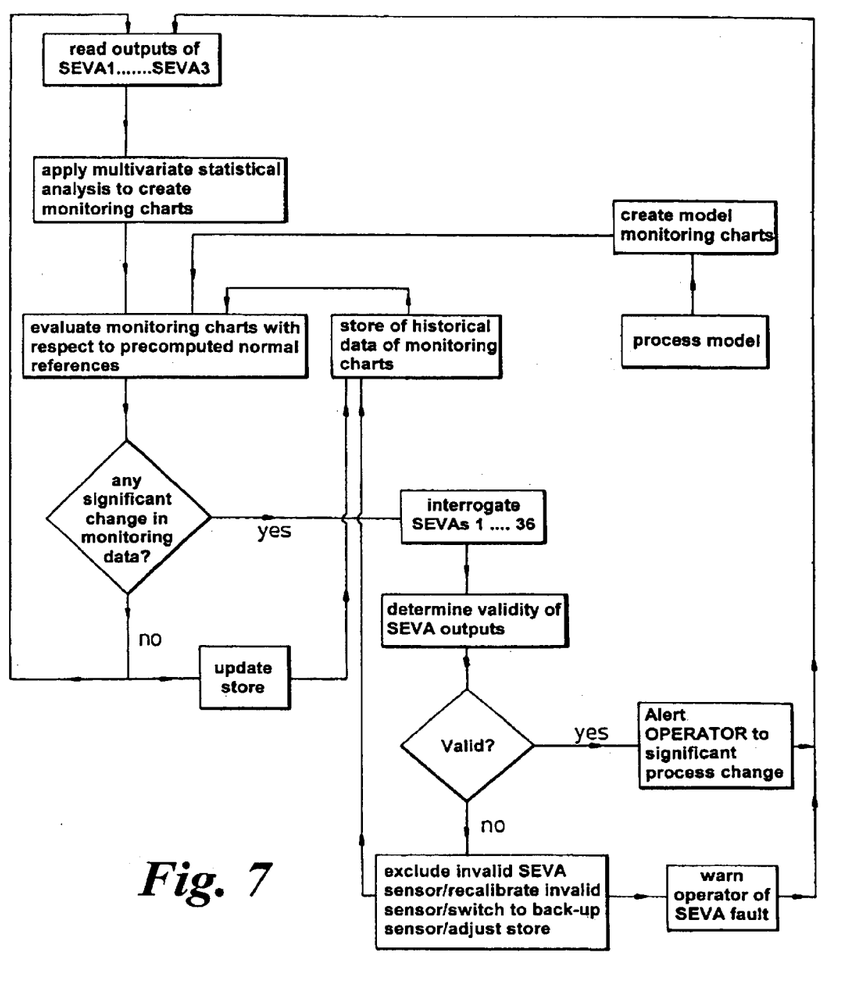
FIG. 7 is a flow chart of the monitoring software of the system of FIG. 4.

The real time monitoring system 16 contains software depicted in FIG. 7 to monitor the validity of the outputs of the sensors SEVA1 to SEVA36, and in the event of the detection of an apparent significant change in the process, interrogate the SEVA sensors.

The comparison of the condition of the process with previous conditions of the process is carried out in the real time monitoring system 16 by multivariate statistics exploiting partial least squares (PLS) analysis. Such techniques are described in MacGregor, 1991, 1995 and Morud 1996 and Kresta 1991. An improved extended partial least squares (EPLS) analysis is described in our co-pending application of even date entitled 'Multivariate Statistical Process Monitors' and that technique is particularly suitable for use in the system of FIG. 4 of the present application. The disclosure of that co-pending application is hereby incorporated into the present application.

It will be appreciated that early and reliable detection of process abnormalities offers the potential to avoid costly incidents which can disrupt normal process operations. Using such advanced multivariate statistics, it is possible to identify abnormalities which would not otherwise be evident. Unit 14 contains a toolbox of such statistical techniques for the monitoring and detection of abnormalities in process operating data. The system installer is able to select which of these statistical techniques are to be employed for the multivariate statistical analysis.

In portion 15 of unit 14, a multivariate statistical model of a process under normal operating conditions is generated in an off-line analysis. The model preferably includes actuator position knowledge. Available technologies in unit 14 for this purpose include Principal Component Analysis for the underlying process model and Kernel Density methods for statistical analyses. In real-time, these technologies are used to compare actual process behaviour with expected normal behaviour as predicted by the model and as indicated by historical data of stored statistical analyses.

Two of the three principal technologies that unit 14 provides are data compression and modelling algorithms. Principal Component Analysis (PCA) examines many process variables and identifies key correlations between them. It then generates a much smaller set of variables, called 'components', which retain the majority of the information contained in the original process measurements. The relationship between new process measurements and the generated components can be monitored to detect a change in the underlying relationships that govern the process.

The second data compression algorithm is called Partial Least Squares (PLS), and uses Least Squares (LS) type modelling to identify the relationship between process inputs and outputs.

It too compresses the process variables, but unlike PCA it differentiates between inputs and outputs. The internal variables, known as 'latent variables', are modelled using a variation of LS modelling, and can be monitored in order to detect changes in the process.

Cross validation has been included for both these algorithms to aid the selection of components and latent variables. Flexibility is available through user selection of key parameters such as the number of data segments to validate on.

Traditional MSPC indicators such as the $T^2$ and Q statistics have also been included. These are derived directly from the PCA and PLS engines, and are established quality measures in the academic arena.

Two characterisation engines are included within unit 14 that allow the user to detect abnormal process operation. Both Elliptical Density Estimation (EDE) and Kernel Density Estimation (KDE) use historical data from the process to form a definition of 'normal' process operation. It is preferable that these algorithms are used in conjunction with PCA or PLS to further enhance the capability of unit 14 to detect abnormal process operation.

Figure 8:
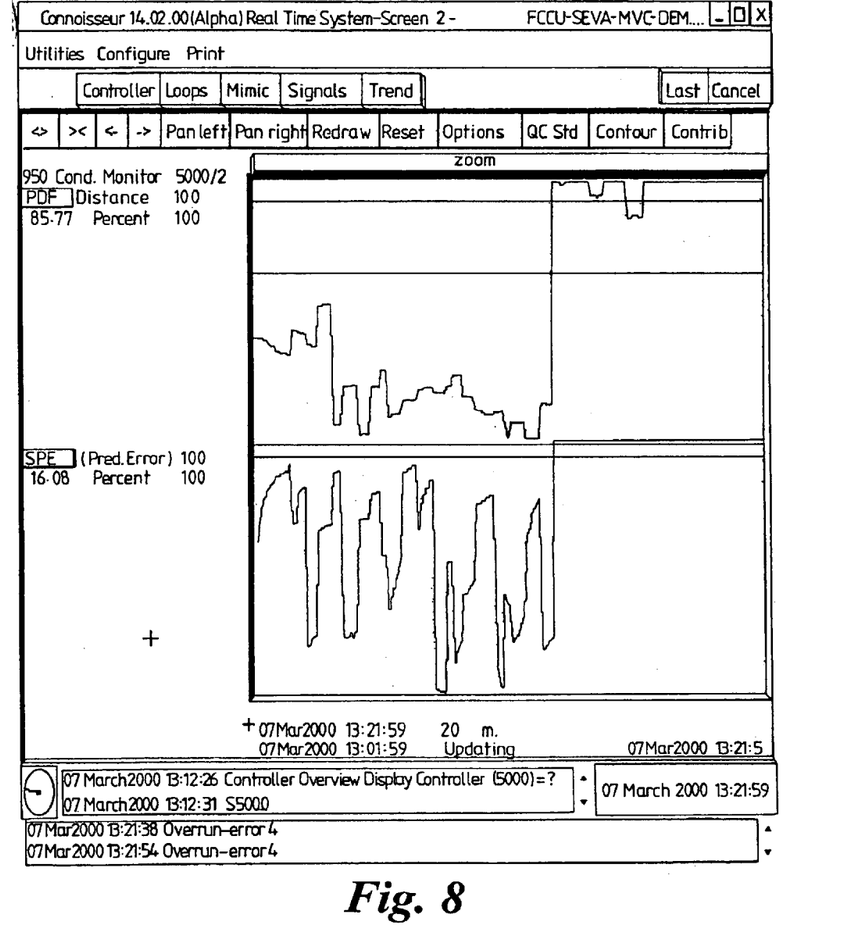
FIG. 8 is a quality control chart of current process operation generated by the monitoring unit of the system of FIG. 4.

The primary fault indicators can be presented on Quality Control charts (FIG. 8). The existence of process abnormality may be indicated by either of these charts exceeding the 99% threshold limit. At this point, an alarm is raised and the SEVA sensors are interrogated, and perhaps requested to carry out more detailed diagnostic checks. If none of the sensors indicates a problem, a process fault is presumed (ie rather than an instrumentation fault) and an alarm signal is generated. The discrepancy between process measurements and the model predictions may be broken down to show contributions from each of the measured variables for more in-depth fault diagnosis.

APPENDIX 1

Definition of SEVA Sensor Fusion

Figure 2:
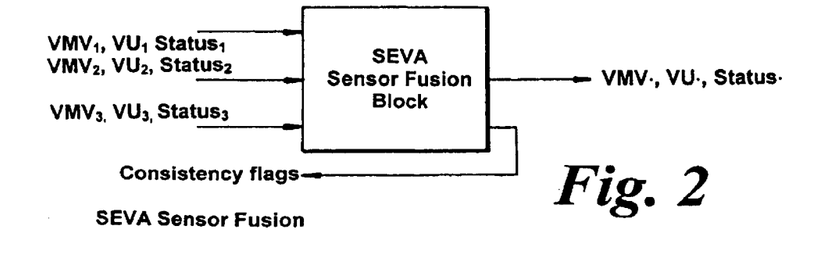

SEVA Sensor Fusion takes place when two or more independent SEVA measurements (VMV, VU and MV Status) of the same process parameter are combined to generate a best estimate (FIG. 2). In addition, consistency flags may be generated to trigger additional diagnostic testing within instruments which are inconsistent with the majority. It is clearly desirable for SEVA fusion to be a largely, automatic process, based solely on the input SEVA variables, and requiring minimum tuning or configuration, so that a standard function block can be used whenever sensor fusion is required.

Outline of Method

The 'model' of the real-world parameter to be estimated is simply a single continuous variable. The model of uncertainty is that provided by metrology: each VMV is supplied with a VU giving 95% probability bounds on the measurement error. Note that the MV status of each input variable is only used in the assignment of status to the output variable; otherwise it is ignored.

A paper by Moffat (1982) suggests a consistency check for two variables only:

Given $x_1 \pm u_1$ and $x_2 \pm u_2$, their difference $y = x_1 - x_2$ will have uncertainty $$\sqrt{u_1^2 + u_2^2},$$

However, assuming $x_1$ and $x_2$ are good estimates of the same parameter, we should expect y to be 'close' to zero. We test this using:

$$|y| < \sqrt{u_1^2 + u_2^2},$$

measurements are consistent

Otherwise, measurements are not consistent.

Note that this rule is more conservative than simply having the uncertainty intervals overlap. Note also that this rule is not part of any standards document.

If a set of measurements are deemed to be consistent estimates of the same parameter, then according to various standards they may be combined in the usual way, weighted by the inverse square of their uncertainties—formulae not given here.

When considering more than two measurements, a number of difficulties arise, for although the rule for combining measurements is easily extended, this is not so for consistency checking, because the relation is not associative. For example, if A is consistent with B, and B with C, it does not follow that A is consistent with C.

Figure 3:
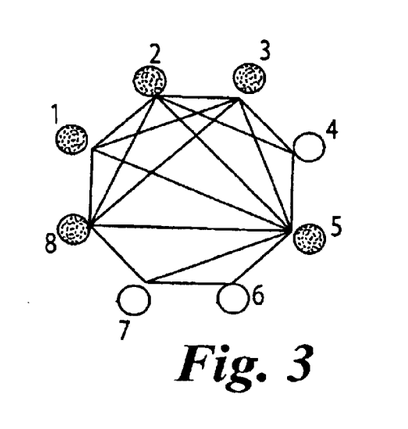
FIG. 3 illustrates schematically for the purposes of Appendix 1 the maximum clique problem.

So, given a set of n measurements, what do we do? A sensible strategy might be to select the largest subset of mutually consistent measurements and to declare these to be the consistent set. It can be shown that this is equivalent to the maximum clique problem in graph theory (illustrated in FIG. 3). That is, given a set of nodes and arcs, find the maximum subset of nodes (shaded) with the property that each node is connected to every other. If each node is a measurement, and each arc a consistency relation, this is equivalent to the SEVA measurement consistency check problem.

Unfortunately this problem is known to be NP-hard ie exhaustive searching is required, which becomes extremely onerous as the number of variables increases. The literature provides a number of algorithms for finding the maximum clique, several of which are optimised for particular applications (ie additional assumptions are made). As yet, none have been found which offers any extra speed to the SEVA application.

However, once the maximum clique is established, the best estimate can be calculated by combining the measurements and uncertainties from the clique.

Dealing with Outliers

The default strategy of leaving outliers out of the calculation is not satisfactory for a number of reasons:

given the probabilistic nature of uncertainty, even if all measurements are 'correct', there is only a 95% chance that each pair will be judged consistent. It will thus be very rare for all measurements to be in the maximum clique (simulation studies have confirmed this).

It is undesirable to have jitters on the output measurement and uncertainty: this will occur if one or more inputs are close to a consistency threshold.

Fortunately, a very simple strategy can be used to eliminate such jitters. For each variable not inside the maximum clique, its 'distance' to consistency with the clique is calculated as a proportion of its own uncertainty. If the distance is great (say >2), then it is declared an outlier and excluded. If it is smaller, however, its uncertainty (for fusion purposes) is increased to make it just consistent with the clique. This has the effect of reducing, but not eliminating, its influence on the output measurement.

This technique of uncertainty expansion is needed in other circumstances too: there is a high probability that at any given time there may be more than one maximum clique. A simple example illustrates the issue: with three measurements, A may be consistent with B, and B with C, but not A with C. This gives two maximum cliques {A,B} and {B,C}. Briefly, this is dealt with by creating a single maximum clique by expanding the uncertainties of those measurements not in each of the original cliques: in the example A and C will have their uncertainties increased, and influence diminished, while B, which is common to both cliques, is left alone. This will create a single maximum consistent set.

A Short-cut

For all but the smallest sets, searching for the maximum clique is extremely time consuming. However, a method for approximating the maximum clique has been found which uses overlapping intervals instead of the Moffat criterion. This method is linear in n. Uncertainty expansion can be used to ensure Moffat consistency prior to calculating the best combined estimate. It can be shown that the net effect of this short cut is a slightly larger uncertainty interval on the output.

Assignment of MV Status

The assignment of MV Status is straightforward when fusing SEVA data, although there are two configuration options to be decided by the user:

How many consistent CLEAR measurements are necessary to assign SECURE status—eg 2 out of 3? 3 out of 3? 4 out of 5? (NB because of the high probability of jitters lowering consistency, it is assumed that such counting takes place AFTER uncertainty expansion ie only serious outliers are excluded)

What is the minimum acceptable number of consistent measurements, below which the output measurement goes DAZZLED or BLIND—eg 2 out of 3? 3 out of 5?

During operation, the following logic is used each sample:

Are there enough consistent CLEAR (or SECURE) measurements in the consistent set—if so assign a status of SECURE.

Are there insufficient consistent measurements—if so assign a status of DAZZLED or in due course BLIND.

Otherwise, assign a status equal to the best status within the consistent set (ie CLEAR if there is at least one CLEAR measurement, else BLURRED if at least one BLURRED measurement etc). The only exception to this rule is that even if one of the inputs is SECURE, the output can only be CLEAR.

Note that if the output is assigned DAZZLED or BLIND status, then the usual rules for assigning VMV and VU apply—ie the statistical properties of the output variable should be monitored so that maximum observed rates of change etc are available for calculating DAZZLED and BLIND measurement output.

REFERENCES

1. Henry M. P., and Clarke D. W., 1993 The self-validating sensor: Rational, definitions and examples. *Control Engineering Practice* 1(4) pp 585–610
2. Yang J. C.-Y. 1994 Self-validating Sensors. D. Phil thesis, Department of Engineering Science, University of Oxford
3. Yang J. C.-Y. and Clarke D. W., 1996 Trans Inst Mc Vol.18 No.1.
4. McFarlane R. C., Reineman R. C., Bartee J. F., Georgakis C., 1993, Dynamic Simulator for a Model IV Fluid Catalytic Cracking Unit, *Computers in Chemical Engineering*, Vol. 17, No. 3, pp. 275–300
5. MacGregor J. F., Marlin T. E., Kresta J., Skagerberg B., 1991, Multivariate Statistical Methods in Process Analysis and Control. AIChE Symposium Proceedings of the Fourth International Conference on Chemical Process Control, AIChE Publ. No. P-67, New York, pp. 79–99
6. Kresta J. V., MacGregor J. F., Marlin T. E., 1991, Multivariate Statistical Monitoring of Process Operating Performance, *The Canadian Journal of Chemical Engineering*, Vol. 69, pp. 35–47
7. MacGregor J. F., Kourti T., 1995, Statistical Process Control of Multivariate Processes, *Control Engineering Practise*, Vol. 3, No. 3, pp 403–414
8. Morud T. E., 1996, Multivariate Statistical Process Control; Example from the Chemical Process Industry, *Journal of Chemometrics*, Vol. 10, pp. 669–675.
9. Moffat R. J., 1982, Contributions to the theory of single sample uncertainty analysis. ASME *Journal of Fluid Engineering*, Vol. 104, June 1982, pp. 250–260.

What is claimed is:

1. A multi-level process monitoring system comprising a process monitoring unit, at a higher level of the system, and a plurality of sensors at a lower level of the system, at least one of the sensors having self-validating capability the sensors being adapted to provide respective measurement values of respective process variables to said monitoring unit, said monitoring unit being so arranged as to monitor the outputs of the sensors and to identify any significant apparent change in the process conditions based on a comparison of apparent process status information, which is obtained by a combination of said sensor outputs, with reference information, and on detection of an apparent significant change, to request additional status information from at least one of the SEVA sensor/s to determine whether the apparent change is in reality due to a change in the characteristics of a particular SEVA sensor rather than an actual significant change in the process conditions.

2. A process monitoring system as claimed in claim 1 comprising one or more actuators to effect process changes, the actuators being arranged to provide the monitoring unit with actuator position signals.

3. A process monitoring system as claimed in claim 1 in which most of the sensors are SEVA sensors.

4. A process monitoring system as claimed in claim 1 in which the monitoring unit obtains the overview using a multivariate statistical analysis of the measurement values of the sensors, and compares the results of that analysis with the reference information to identify any significant apparent change in process conditions, to determine to initiate interrogation of the SEVA sensor/s.

5. A process monitoring system as claimed in claim 4 in which the reference information is comprised of predictions of a model and historical data of stored statistical analyses.

6. A process monitoring system as claimed in claim 5 in which the model utilizes actuator position information.

7. A process monitoring system as claimed in claim 1 in which the request for additional status information initiates an application of a non-routine test in or to at least one of the SEVA sensors.

8. A process monitoring system as claimed in claim 1 in which at least some SEVA sensors measure the same variable, and the SEVA measurements (VMV, VU and MV status) of the same variable are combined to generate a best estimate.

9. A method comprising:
receiving a first sensor signal from a first sensor monitoring a process, the first sensor being a self-validating (SEVA) sensor;
receiving a second sensor signal from a second signal monitoring the process;
combining the first sensor signal and the second sensor signal at a control unit to determine apparent status information related to the process;
comparing the apparent status information with reference data to obtain comparison information; and
obtaining sensor status information related to the first sensor, in response to the comparison information.

10. The method of claim 9 further comprising distinguishing between a change in a condition of the process and a malfunction of the first sensor, based on the sensor status information.

11. The method of claim 9 wherein analyzing the first sensor signal and the second sensor signal comprises implementing a multivariate statistical analysis of the first sensor signal and the second sensor signal.

12. The method of claim 9 wherein the reference data includes a pre-determined model of behavior of the first sensor and the second sensor with respect to the process.

13. The method of claim 12 wherein the model is based on actuator position signals obtained from actuators involved in the process.

14. The method of claim 9 wherein the reference data includes historical data describing past behavior of the first sensor and the second sensor with respect to the process.

15. A system comprising:
a first sensor operable to output a first measurement of a first variable related to a process;
a second sensor operable to output a second measurement of a second variable related to the process;
a process monitor having access to sensor reference information and operable to combine the first measurement and second measurement to obtain an apparent process status, and further operable to compare the apparent process status with the sensor reference information so as to distinguish between a sensor malfunction and an actual process status.

16. The system of claim 15 wherein the process monitor is operable to analyze the first measurement and the second measurement using a multivariate statistical analysis.

17. The system of claim 15 wherein the reference information includes a theoretical model of behavior of the process.

18. The system of claim 17 wherein the theoretical model includes position signals obtained from actuators involved in implementing the process.

19. The system of claim 15 wherein the reference information includes historical data describing the process.

* * * * *